I. L. EDWARDS.
NUT LOCK.
APPLICATION FILED APR. 20, 1917.
1,304,667.
Patented May 27, 1919.
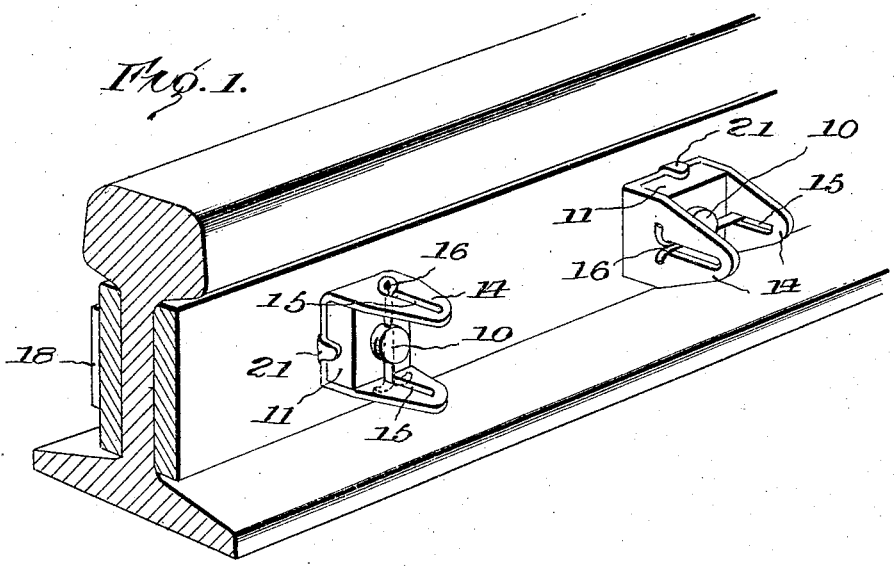
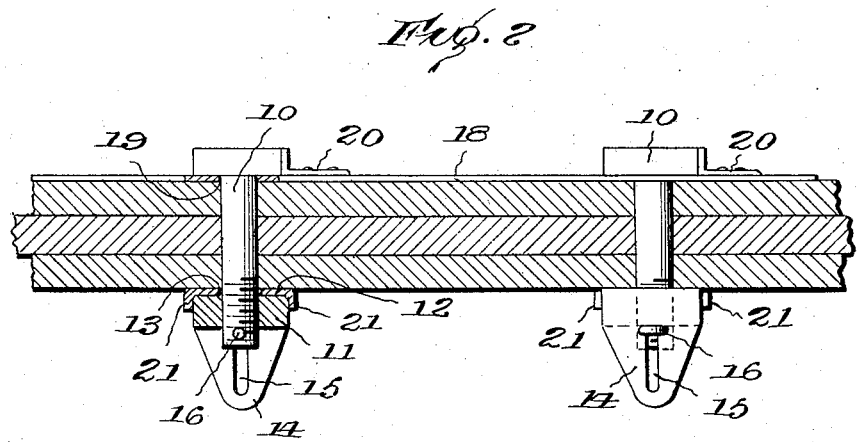
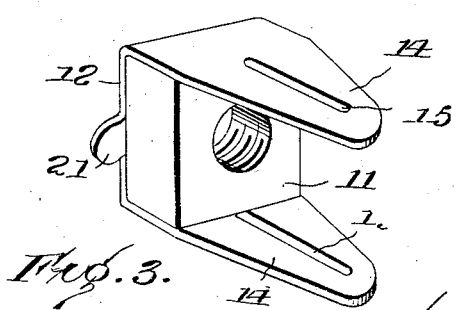
Inventor
Isaac L. Edwards
By Chas. J. Williamson
Attorney

UNITED STATES PATENT OFFICE.

ISAAC L. EDWARDS, OF AURORA, ILLINOIS.

NUT-LOCK.

1,304,667.  Specification of Letters Patent.  Patented May 27, 1919.

Application filed April 20, 1917. Serial No. 163,486.

*To all whom it may concern:*

Be it known that I, ISAAC L. EDWARDS, a citizen of the United States, and resident of Aurora, in the county of Kane, and in the State of Illinois, have invented a certain new and useful Improvement in Nut-Locks, and do hereby declare that the following is a full, clear, and exact description thereof.

My invention relates to nut locks and my object is to provide a nut lock easy and cheap of manufacture which will certainly perform its function, be capable of easy application and removal and constitute a convenient means for manipulating the nut in applying it to and removing it from the bolt, or screw, and to this end my invention consists in the lock constructed substantially as hereinafter specified and claimed.

In the accompanying drawings—

Figure 1 is a perspective view showing my invention as adapted for railroad use;

Fig. 2 is a horizontal section thereof;

Fig. 3 is a detail view in perspective of the nut and nut-engaging member.

While I show in the drawings my invention as adapted for railroad use, it must be understood that I do not limit myself to any particular application thereof, for it may be applied to automobiles and any other mechanism requiring the use of such a device.

The bolt 10 and the nut 11, shown, are of ordinary construction, the bolt being shown as having a four sided head and the nut being shown as being square, or having four flat sides. 12 is a plate lying at the inner side of the nut and performing the function of a washer having, of course, a hole 13 for the passage of the bolt 10, and its opposite edges are bent outward parallel with the bolt axis so that they lie snug against the adjacent flat sides of the nut and project a substantial distance beyond the outer face of the nut, thus providing a pair of parallel wings, or extensions 14 at right angles to the washer part of the device. As the nut fits snugly, or closely between said wings, it will be evident that they constitute a sort of handle and turning device by means of which the nut may be readily placed upon the end of the bolt under conditions making ready accessibility difficult, or troublesome, and the nut can be readily turned either for screwing it upon the bolt, or removing it therefrom. Each of said wings has a slot 15 that reaches from a point substantially in the plane of the outer face of the nut when in position outward therefrom, and said slots are in alinement with each other and are adapted to be placed in alinement with any one of several diametrally extending holes in the outer end of the bolt so that when the nut is screwed home the perforated portion of the bolt will project beyond its outer face to enable a headed locking pin 16 to be passed through said alining slots and one of said diametrally extending holes and thus nut and bolt securely locked from relative rotation. When it is necessary to remove the nut it is required merely to remove the locking pin which can be readily done. It will be seen that no special formation of the nut is required for the use of my device and the bolt construction requires nothing special beyond the ordinary construction, except the diametrally extending holes 17.

To prevent turning of the bolt and nut when locked together, a suitable locking device for the bolt may be employed, which, as shown, may consist of a plate 18 long enough to reach between several bolts and provided with a hole 19 for each bolt and applied so that it is at the inner side of the bolt head, and having on its outer side an outwardly projecting lip, or lug 20 which engages one side of the bolt head.

The washer part 12 has preferably at each side between the two wings a lug 21, which overlies the adjacent side of the nut and thus the nut when in position between the wings and the lugs and before its application to the bolt, or after its removal therefrom, is securely retained so that nut and locking member may thus readily be handled as a unit. Said lugs 21 are readily bendable so that either or both may be bent over an adjacent stationary surface at right angles thereto after the nut has been applied to the bolt and thereby the nut and the bolt prevented from turning together. This device of the lugs 21 to engage a stationary surface to prevent turning of the nut and bolt need not be employed if other means, such as the bolt head-engaging device is employed to prevent turning of the nut and bolt when locked together.

It will be seen that my device, while possessing the important characteristics hereinbefore set out, can be very easily and inexpensively made merely by stamping operations.

Having thus described my invention what I claim is—

1. A nut lock comprising a plate perforated for the passage of the bolt and having at opposite sides parallel wings that receive between them and engage opposite sides of the nut, and means for locking the nut and bolt comprising a pin and alining slots in said wings, said wings projecting beyond the outer face of the nut.

2. A nut lock comprising a plate perforated for the passage of the bolt and having at opposite sides parallel wings that receive between them and engage opposite sides of the nut, and means for locking the nut and bolt comprising a pin and alining slots in said wings, said wings projecting beyond the outer face of the nut, and a lug overhanging the side of the nut situated between said wings and bendable into and from contact with the side of the nut.

In testimony that I claim the foregoing I have hereunto set my hand.

ISAAC L. EDWARDS.

Copies of this patent may be obtained for five cents each, by addressing the "Commissioner of Patents, Washington, D. C."